United States Patent
Sakane et al.

(10) Patent No.: US 7,658,434 B2
(45) Date of Patent: Feb. 9, 2010

(54) STRUCTURE OF REAR PART IN VEHICLE BODY

(75) Inventors: Hideto Sakane, Utsunomiya (JP); Kazuhiko Sato, Tokyo (JP); Tohru Ono, Utsunomiya (JP); Shinichi Ibato, Utsunomiya (JP); Tetsuya Higurashi, Warabi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/003,135

(22) Filed: Dec. 20, 2007

(65) Prior Publication Data
US 2008/0258504 A1 Oct. 23, 2008

(30) Foreign Application Priority Data
Dec. 26, 2006 (JP) .......................... P2006-349237

(51) Int. Cl.
*B62D 25/10* (2006.01)
*B60R 5/04* (2006.01)
(52) U.S. Cl. .................. 296/76; 296/24.43; 296/146.15
(58) Field of Classification Search .............. 296/24.43, 296/51, 56, 76, 146.2, 146.15
See application file for complete search history.

(56) References Cited

U.S. PATENT DOCUMENTS

| | | | |
|---|---|---|---|
| 2,963,936 A * | 12/1960 | Court ........................ | 359/837 |
| 3,198,571 A | 8/1965 | Majeski | |
| 3,290,088 A * | 12/1966 | Wilfert ................... | 296/146.15 |
| 3,809,462 A * | 5/1974 | Baumgardner et al. ...... | 359/726 |
| 4,274,714 A * | 6/1981 | Okamura ..................... | 359/726 |
| 4,886,312 A | 12/1989 | Asoh | |
| 4,961,637 A | 10/1990 | Ou | |
| 2005/0206185 A1 | 9/2005 | Kimmet | |
| 2006/0261318 A1 * | 11/2006 | Morimoto et al. ........... | 252/582 |

FOREIGN PATENT DOCUMENTS

DE 41 34 198 A1 4/1993

(Continued)

OTHER PUBLICATIONS

Motor Fun, Additional volume, "All about the new CIVIC and CR-X", Japan, San-eishobo Publishing Co., Ltd., Nov. 7, 1987, Special No. 56, p. 59.

(Continued)

*Primary Examiner*—Jason S Morrow
(74) *Attorney, Agent, or Firm*—Arent Fox LLP

(57) ABSTRACT

A structure of a rear part in a vehicle body. A rear glass window is provided at a rear end part of a roof of the vehicle, and the rear glass window is inclined downward toward the back of the vehicle. A trunk compartment is formed from a part below an attachment part of the rear glass window to a rear end part of the vehicle body. A trunk lid is attached to a lower edge of the attachment part of the rear glass window in a manner such that the trunk lid can be opened and closed freely. A visual window for observing a field on the back side of the vehicle body is provided in a wall of the trunk lid, the wall being positioned on the back side of the vehicle body. A partition wall having an interior window may be provided below the rear glass window.

17 Claims, 9 Drawing Sheets

FOREIGN PATENT DOCUMENTS

| | | |
|---|---|---|
| DE | 44 07 131 A1 | 6/1995 |
| JP | 64-41424 U | 3/1989 |
| JP | 01-134539 A | 5/1989 |
| JP | 1-134538 U | 9/1989 |
| JP | 03-016516 A | 1/1991 |
| JP | 2003-343154 | 3/2003 |

OTHER PUBLICATIONS

Motor Magazine, Japan, Motor Magazine Ltd., Oct. 1, 2003, vol. 49, No. 11, p. 34.

* cited by examiner

STRUCTURE OF REAR PART IN VEHICLE BODY

BACKGROUND OF THE INVENTION

1. Field of the Invention

The present invention relates to a structure of a rear part in a body of a vehicle, which has an independent trunk compartment (or luggage room) on the rear side of the interior in the vehicle.

Priority is claimed on Japanese Patent Application No. 2006-349237, filed Dec. 26, 2006, the content of which is incorporated herein by reference.

2. Description of the Related Art

Generally, in a sedan (or saloon) vehicle, a rear glass window (or a rear windowpane) is provided, which is inclined from the rear end of the roof toward the back of the vehicle body, and a trunk compartment is formed from an area below an attachment part for the rear glass window to the rear end of the vehicle. The trunk compartment is isolated from the interior of the vehicle by a partition wall, which is provided in the vicinity of the lower end of the rear glass window, and the upper part (toward the outside of the vehicle) of the trunk compartment is covered with a trunk lid. The trunk lid is attached via a hinge to the lower edge of the rear-glass-window attachment part in the vehicle body, in a manner such that it can be opened and closed (see, for example, Japanese Unexamined Patent Application, First Publication No. 2003-343154).

When a large-sized part such as a tank or a cylinder is installed on the back side of a rear seat in a sedan vehicle, such a large-sized part occupies a front space of the trunk compartment. In order to solve this problem, the overhang on the back side of the vehicle body, or the width of the vehicle may need to be enlarged. However, such enlargement may be difficult due to design or applied standards.

In this case, the height of the trunk lid may be increased so as to provide a desired height of the trunk compartment. However, in accordance with an increase in the height of the trunk lid, the vertical width of the rear glass window is decreased, which narrows the rear visual field observable from the interior of the vehicle.

SUMMARY OF THE INVENTION

In light of the above circumstances, an object of the present invention is to provide a structure of a rear part in a body of a vehicle, which can enlarge the capacity of the trunk compartment without narrowing the rear visual field observed from the interior of the vehicle.

Therefore, the present invention provides a structure of a rear part in a body of a vehicle, wherein:

a rear glass window (e.g., a rear glass window 2 in embodiment explained later) is provided at a rear end part of a roof (e.g., a roof 1 in the embodiments) of the vehicle, and the rear glass window is inclined downward toward the back of the vehicle body;

a trunk compartment (e.g., a trunk compartment 3 in the embodiments) is formed from a part below an attachment part of the rear glass window to a rear end part of the vehicle body;

a trunk lid (e.g., a trunk lid 7 in the embodiments) is attached to a lower edge of the attachment part of the rear glass window in a manner such that the trunk lid can be opened and closed freely; and a visual window (e.g., a visual window 8 in the embodiments) for observing a field on the back side of the vehicle body is provided in a wall (e.g., a rear wall 7b in the embodiments) of the trunk lid, the wall being positioned on the back side of the vehicle body.

In accordance with the above structure, it is possible to observe a field on the back side of the vehicle, from the interior thereof through the rear glass window and the visual window of the trunk lid. Therefore, a large rear visual field can be provided even when the height of the trunk lid is increased. Accordingly, the capacity of the trunk compartment can be increased without narrowing the rear visual field observed from the interior of the vehicle.

In the above structure, a visual-field control device (e.g., a visual-field control panel 10 in the embodiments) for permitting observation of the field on the back side of the vehicle body from the interior of the vehicle and for preventing the trunk compartment from being observed from the back side of the vehicle body may be provided at the visual window.

Accordingly, it is possible to prevent the trunk compartment from being observed though the visual window from the back side of the vehicle body.

It is possible that:

a partition wall (e.g., a rear tray 12 in the embodiments) for parting the trunk compartment from the interior of the vehicle is provided below the rear glass window; and an interior window (e.g., an interior window 15 in the embodiments) for observing the field on the back side of the vehicle body through the visual window of the trunk lid is formed in the partition wall.

Accordingly, it is possible to observe a field on the back side of the vehicle, from the interior thereof through the interior window in the partition wall and the visual window of the trunk lid. Therefore, the rear visual field can be enlarged while providing a sufficient space in the trunk compartment by increasing the height of the partition wall.

In this case, preferably, a visual-field control device for preventing the trunk compartment from being observed is provided at the interior window. Accordingly, it is possible to prevent the trunk compartment from being observed through a side window and the interior window of the vehicle body (i.e., from the side window through the interior window).

When the visual-field control device is provided at the visual window or the interior window, it may have a visual-field control film, whose transparency varies depending on a visual angle.

In this case, the visual field can be appropriately made opaque at an angle which is not included in the visual angle range for observing a field on the back side of the vehicle from the interior thereof. Therefore, it is possible to prevent the trunk compartment from being observed, by using a simple structure.

Typically, the visual-field control film provided at the visual window of the trunk lid is formed so as to set an opaque angle range of the film to an angle range at which the bottom side of the trunk compartment is observable from the back side of the vehicle body.

Accordingly, the visual-field control film is made opaque at an angle for observing the bottom side of the trunk compartment through the visual window from the back side of the vehicle body. Therefore, it is possible to reliably prevent the bottom side of the trunk compartment from being observed through the visual window.

Also typically, the visual-field control film provided at the interior window in the partition wall is formed so as to set an opaque angle range of the film to an angle range at which the trunk compartment is observable from each side window of the vehicle body.

Accordingly, the visual field is made opaque at an angle for observing the trunk compartment through the interior window from a side window of the vehicle body. Therefore, it is possible to reliably prevent the trunk compartment from being observed through the interior window from the side window of the vehicle body.

In a preferable example, a cover, which is arranged substantially horizontally so as to cover the upper side of the trunk compartment, is provided under the visual window.

DETAILED DESCRIPTION OF THE INVENTION

Figure 1:
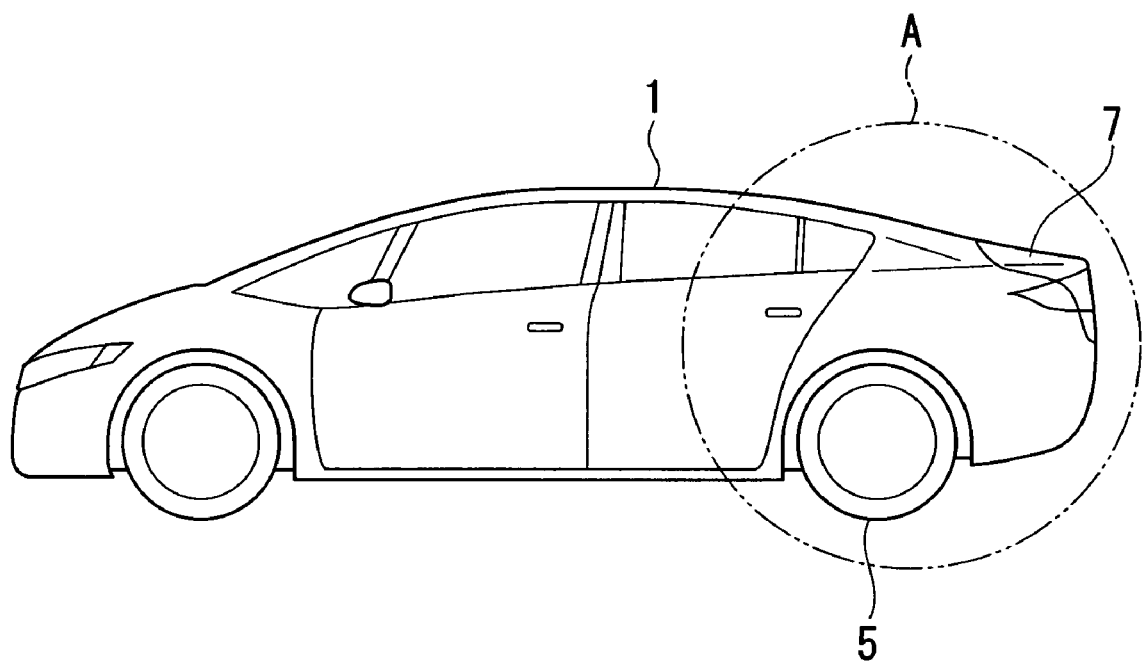
FIG. 1 is a side view of a vehicle for explaining embodiments of the present invention.

Hereinafter, embodiments in accordance with the present invention will be described with reference to the appended figures. In the embodiments, identical parts are given identical reference numerals, and duplicated explanations are partially omitted.

First, a first embodiment will be explained with reference to FIGS. 1 to 5.

Figure 2:
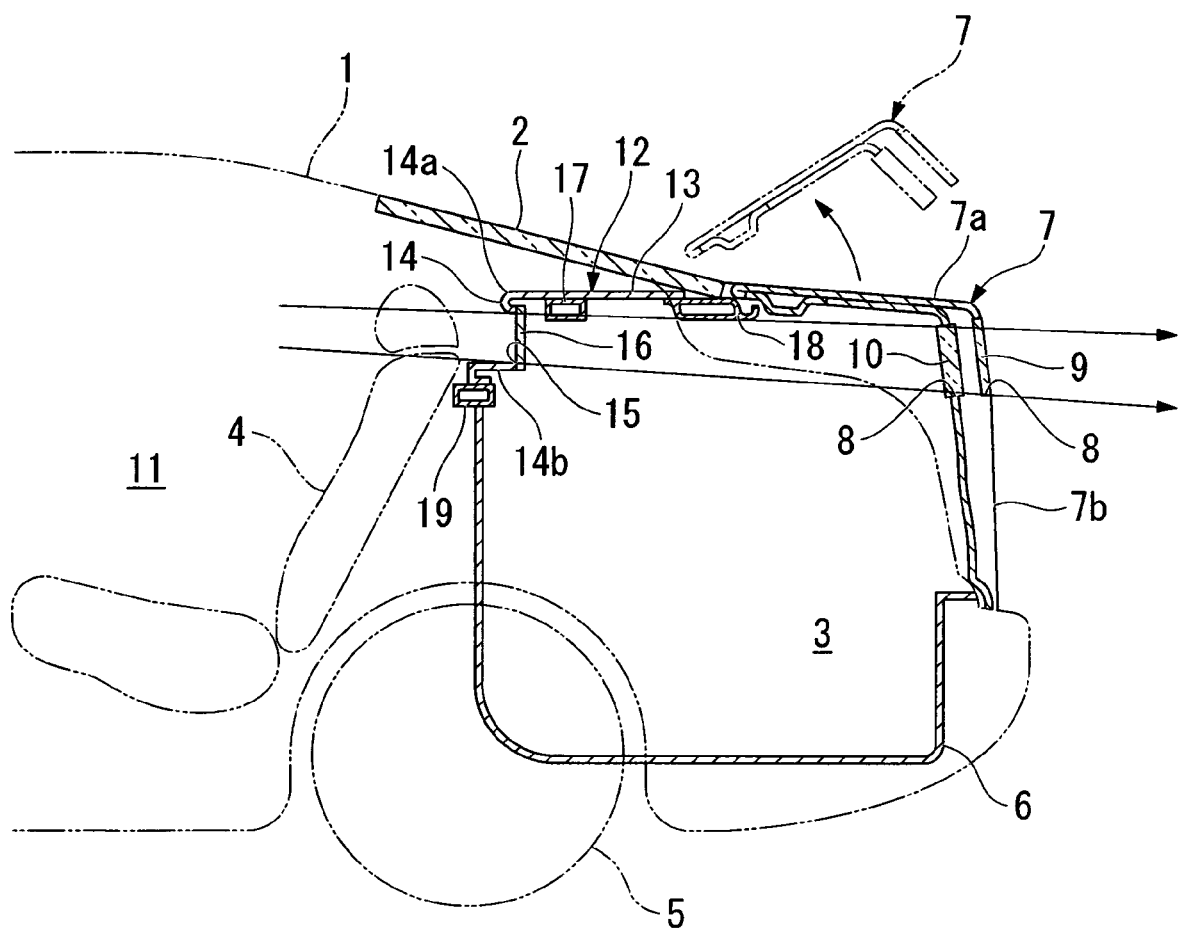
FIG. 2 is a schematic sectional view of a part corresponding to part A in FIG. 1, so as to show a first embodiment in accordance with the present invention.

As shown in FIG. 2, in a sedan vehicle of the first embodiment, a rear glass window 2 is arranged at a rear-end part of a roof 1, and is inclined toward the back of the vehicle body. A trunk compartment 3 is provided from a part below the area where the rear glass window 2 is provided toward a rear-end part of the vehicle body. In FIG. 2, reference numeral 4 indicates a rear seat arranged in an interior 11 of the vehicle, reference numeral 5 indicates a rear wheel of the vehicle, and reference numeral 6 indicates a trunk floor panel for forming the trunk compartment 3.

A trunk lid 7 is provided at the lower edge of the attachment part of the rear glass window 2 via a hinge (not shown), and the opening of the trunk compartment 3 on the back side of the vehicle body can be closed and opened using the trunk lid 7.

The trunk lid 7 has a substantially L-shaped section when observed from a side of the vehicle body, and includes an upper wall 7a, which covers the upper side of the trunk compartment 3 when the trunk lid 7 is closed, and a rear wall 7b for covering the back side of the trunk compartment 3. A visual window 8, having an elongated form in the horizontal direction, is provided at the upper edge of the rear wall 7b, where the center of the visual window 8 substantially coincides with the center of the vehicle in the width direction. The visual window 8 is formed through an outer panel and an inner panel of the trunk lid 7, where a transparent resin panel 9 is attached to the relevant opening of the outer panel, while a visual-field control panel 10 (explained later), which includes a visual-field control film, is attached to the relevant opening of the inner panel. Through the visual-field control panel 10, a field on the back side of the vehicle is visible from the interior of the vehicle with respect to an ordinary visual angle range.

In addition, below the rear glass window 2, a rear tray 12 (as a partition wall) for parting the trunk compartment 3 from the interior 11 is provided on the back side of the rear seat 4. The rear tray 12 includes a horizontal wall 13, which has substantially the same height as the lower edge of the rear glass window 2 and covers the upper side of the trunk compartment 3 substantially horizontally, and a front wall 14, which bends downward from the front end of the horizontal wall 13. In the front wall 14, an interior window 15 is provided, through which a field on the back side of the vehicle body is visible also through the visual window 8 of the trunk lid 7.

In the present embodiment, the front wall 14 has an upper block 14a, which is integral with the horizontal wall 13, and a lower block 14b, which is separate from the upper block 14a, where both blocks are coupled with each other via a visual-field control panel 16. Accordingly, the interior window 15 is formed between the upper block 14a and the lower block 14b. In addition, in the rear tray 12, the front and back of the horizontal wall 13 are supported by cross members 17 and 18 of the vehicle body, and the lower end of the front wall 14 is supported by a cross member 19 provided on the back side of the rear seat 4.

Also in the present embodiment, the front edge of the upper block 14 in the rear tray 12 protrudes frontward in comparison with the position where the visual-field control panel 16 is provided. Therefore, the protruding part functions as a pent roof for preventing light from being reflected onto the visual-field control panel 16.

The visual-field control panels 10 and 16, which are respectively attached to the visual window 8 of the trunk compartment 7 and the interior window 15 of the rear tray 12, are each formed by interposing a visual-field control film between polycarbonate resin materials or the like. Owing to a function of the visual-field control film, the visual field is made transparent within a specific visual angle range, while the visual field is made opaque at an angle which is not included in the specific visual angle range. The visual-field control panels 10 and 16 can have an appropriate opaque angle range due to design of the visual-field control film, thereby preventing undesired looking in from the outside of the vehicle. As the visual-field control film, a film named "Lumisty", manufactured by LINTEC corporation, may be used.

Figure 3:
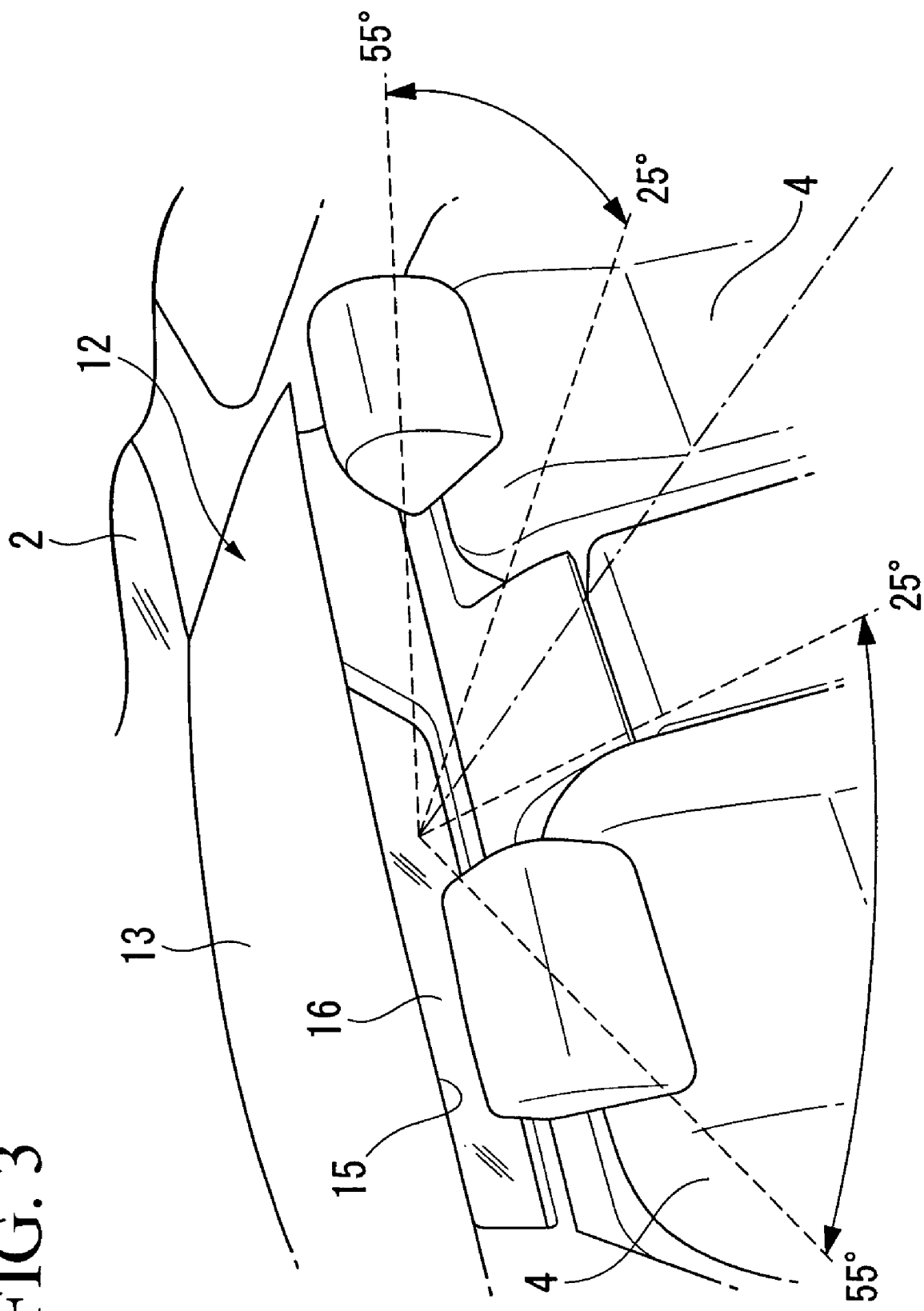
FIG. 3 is a perspective view when observing the rear side of the vehicle from the interior thereof, in the first embodiment.
Figure 5:
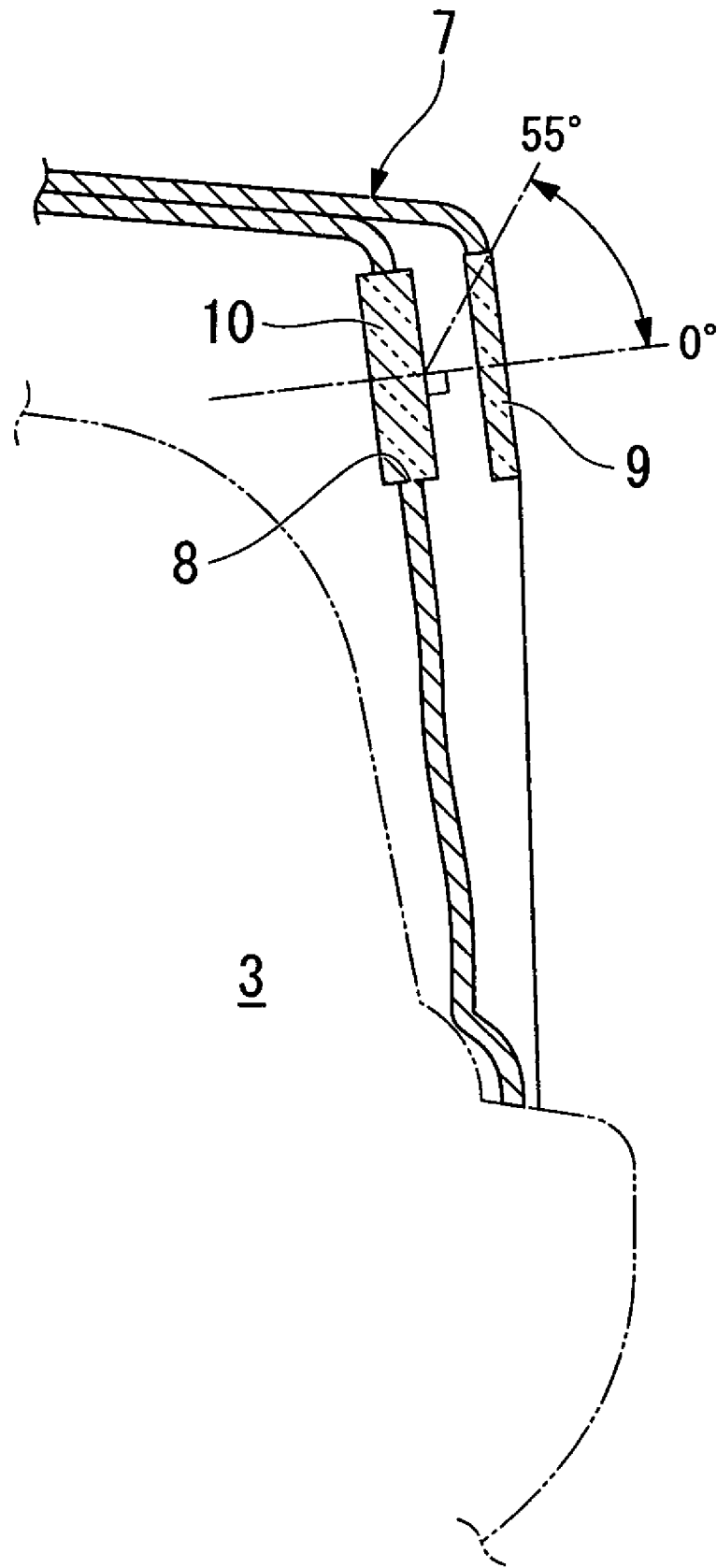
FIG. 5 is a schematic sectional view of a rear part of the vehicle body in the first embodiment.

In a specific example, as shown in FIG. 3, the visual-field control panel 16, which is attached to the interior window 15 of the rear tray 12, has each left-to-right range between 25 to 55 degrees on the right and left sides with respect to the vehicle's progress (or travel) direction as an opaque angle range, thereby preventing the inside of the trunk compartment 3 from being observed through a side window and the interior window 15 of the vehicle. With respect to the visual-field control panel 10 attached to the visual window 8 of the trunk lid 7, as shown in FIG. 5, the opaque angle range may be set to a vertical range from 0 to 55 degrees with respect to a plane perpendicular to the visual-field control panel 10, thereby preventing the inside of the trunk compartment 3 from being observed through the visual window 8 from the back side of the vehicle.

Figure 4:
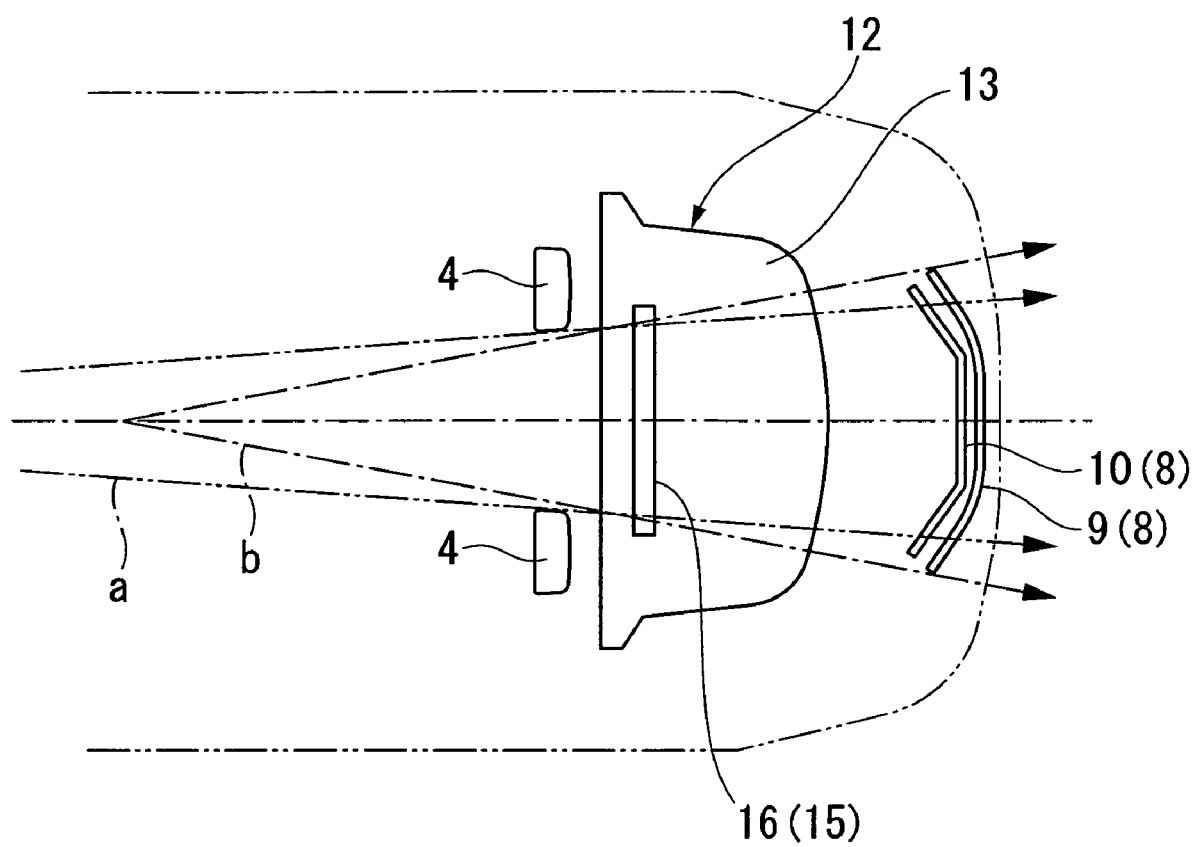
FIG. 4 is a schematic plan view of the vehicle in the first embodiment.

In addition, as shown in FIG. 4, the interior window 15 (corresponding to the visual-field control panel 16) and the visual window 8 (corresponding to the visual-field control panel 10 and the resin panel 9) are arranged so that a sufficient horizontal angle range of an area on the back side of the vehicle is visible through a space between head rests of two rear seats 4, in either case of (i) indirect vision through a rearview mirror; (see reference symbol "a") and (ii) direct vision by turning back (see reference symbol "b").

As described above, in the present sedan vehicle, the visual window 8 is formed above the rear wall 7b of the trunk lid 7, and the interior window 15 is formed between the upper block 14a and the lower block 14b of the front wall 14. Therefore, a field on the back side of the vehicle is visible through the visual window 8 and the interior window 15. Accordingly, the rear visual field through the visual window 8 and the interior window 15 is added to the rear visual field through the rear glass window 2, so that totally, a wide rear visual field can be provided. Therefore, in the present sedan vehicle, the trunk lid 7 or the rear tray 12 can be sufficiently high so as to sufficiently increase the capacity of the trunk compartment 3 in the vertical direction, without sacrificing (i.e., narrowing) the rear visual field.

In addition, the visual-field control panel 10 for providing the upward opaque angle range from 0 (i.e., the position of a plane perpendicular to the panel) to 55 degrees is attached to the visual window 8 of the trunk lid 7. Therefore, it is possible to reliably prevent the trunk compartment 3 from being observed from the back side of the vehicle, without affecting the rear visual field observed from the interior of the vehicle. Furthermore, in the opaque area, an outside view is reflected on the panel, thereby improving the quality of outward appearance.

Additionally, the visual-field control panel 16 for providing the opaque left-to-right angle range between 25 to 55 degrees on each of the right and left sides of the vehicle with respect to the vehicle's progress direction is attached to the interior window 15 at the front wall 14 of the rear tray 12. Therefore, also in this part, it is possible to reliably prevent the trunk compartment 3 from being observed from each side of the vehicle, without affecting the rear visual field observed from the interior of the vehicle.

The visual-field control device applied to the interior window 15 is not limited to the visual-field control panel 16, and another device may be employed.

Figure 6A:
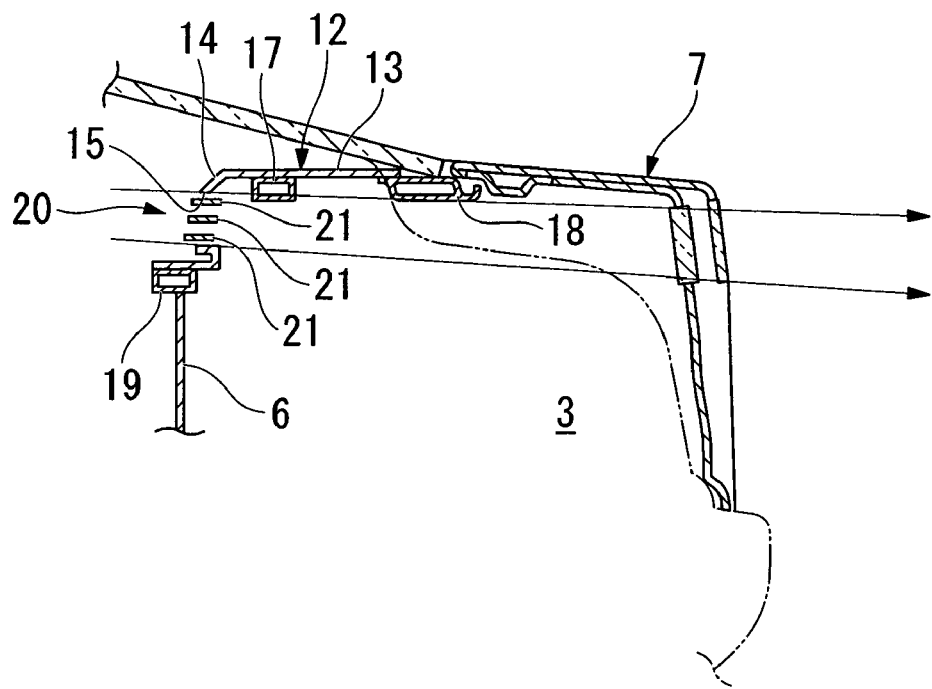
FIGS. 6A and 6B are schematic sectional views showing a second embodiment in accordance with the present invention.
Figure 6B:
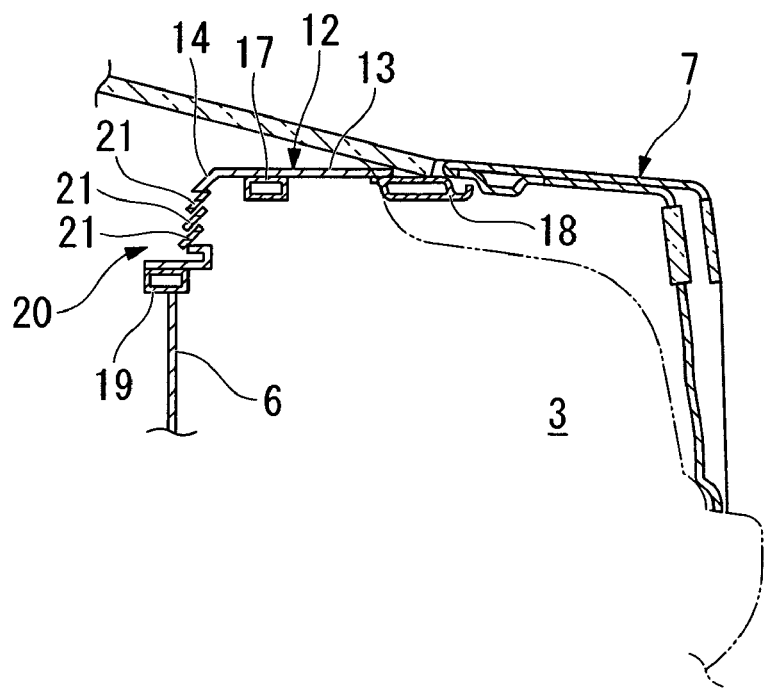

For example, as a second embodiment shown in FIGS. 6A and 6B, a louver-type shutter 20, which can be opened and closed, may be attached to the interior window 15. In this case, when the vehicle runs, louver boards 21 are laid down so as to provide a rear visual field (see FIG. 6A), and when the vehicle stops, the louver boards 21 are raised up so as to close the interior window 15 (see FIG. 6B).

Figure 7:
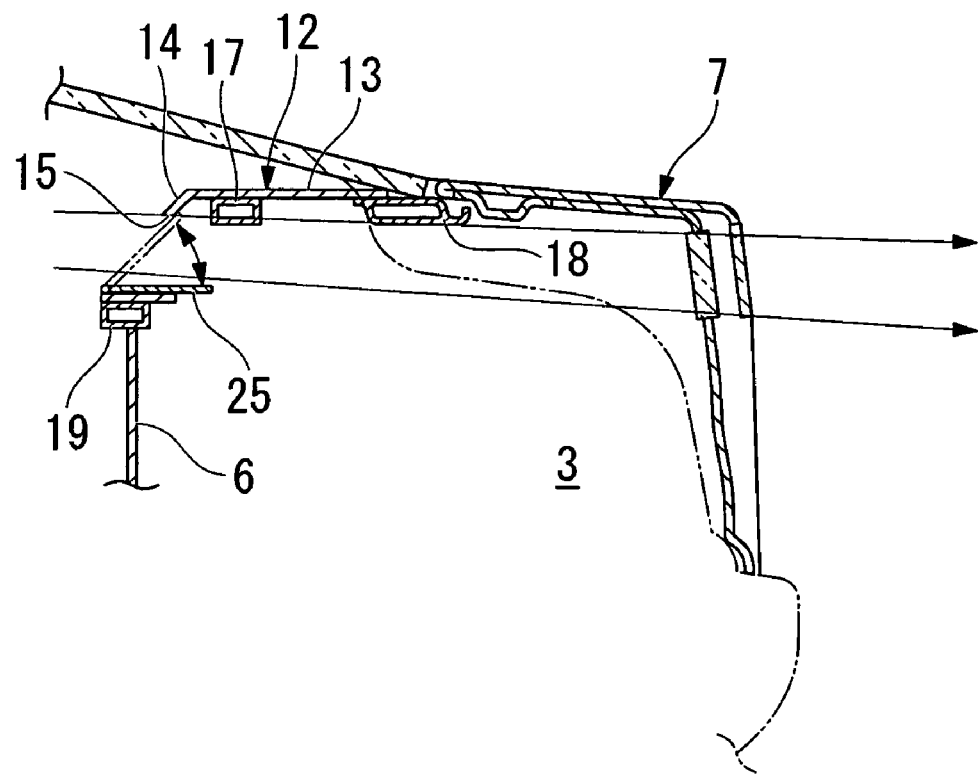
FIG. 7 is a schematic sectional view showing a third embodiment in accordance with the present invention.

Additionally, in a third embodiment shown in FIG. 7, a shutter 25 as a single board is attached to the interior window 15, so that the interior window 15 can be opened or closed by using the shutter 25 in accordance with necessity.

The visual-field control device applied to the visual window 8 is also not limited to the visual-field control panel 10, and another device may be employed.

Figure 8:
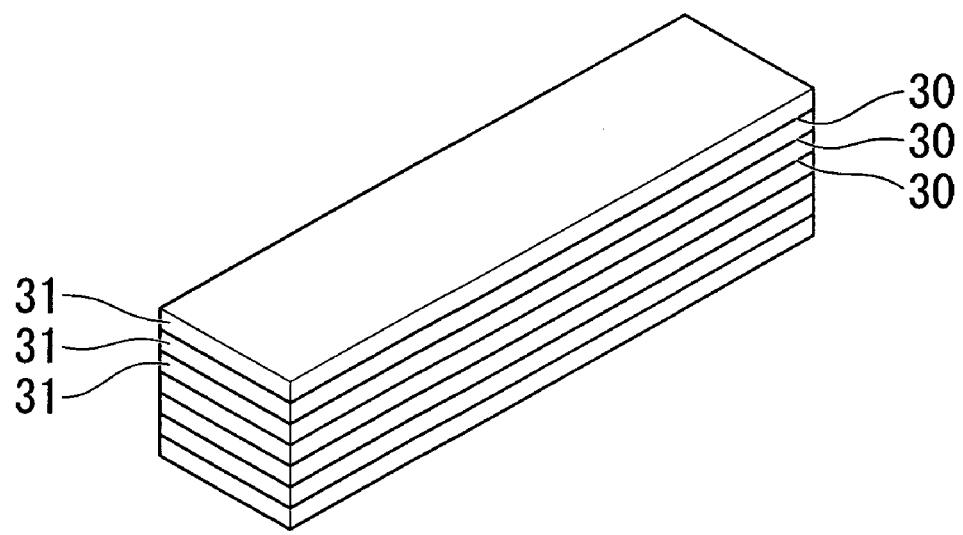
FIG. 8 is a perspective view showing a fourth embodiment in accordance with the present invention.

For example, as a fourth embodiment shown in FIG. 8, a plurality of acrylic resin boards 31 may be used, where each stacked plane of the boards is black-printed (see reference numerals 30). In this case, a view along the black-printed planes is permitted, while a view in a direction which intersects the black-printed planes is not permitted.

Figure 9:
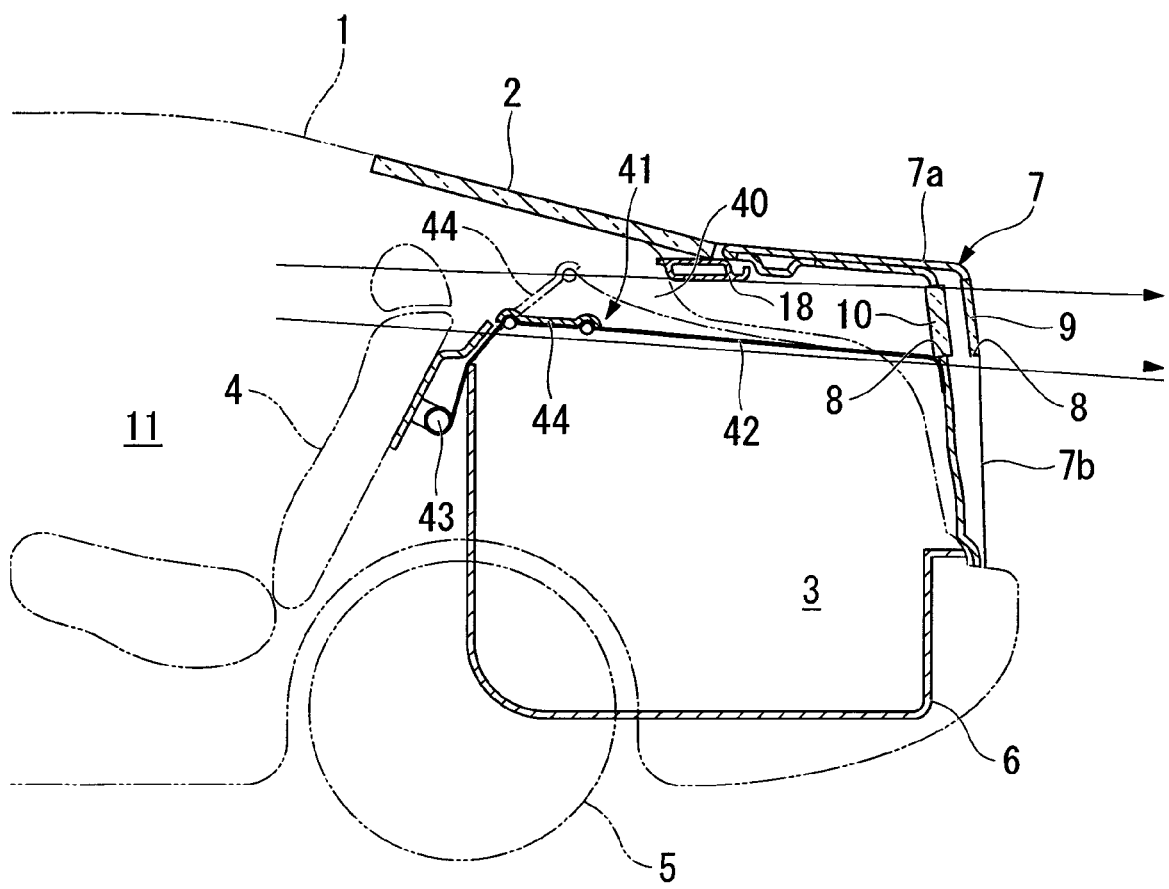
FIG. 9 is a schematic sectional view of a part corresponding to part A in FIG. 1, so as to show a fifth embodiment in accordance with the present invention.
Figure 10:
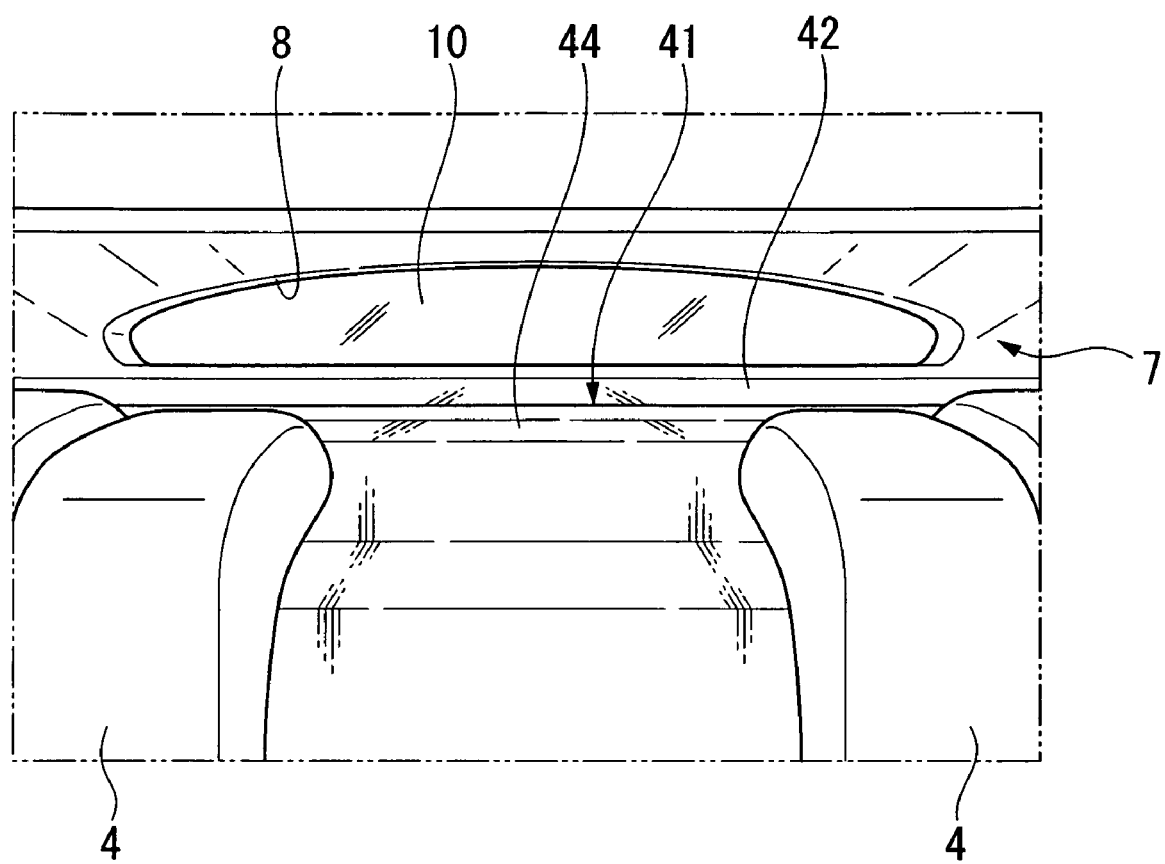
FIG. 10 is a perspective view when observing the rear side of the vehicle from the interior thereof, in the fifth embodiment.

Below, a fifth embodiment of the present invention will be explained with reference to FIGS. 9 and 10.

Similar to the first embodiment, in a sedan vehicle of the present embodiment, a rear glass window 2 is provided at a rear end part of a roof 1, where the rear glass window 2 is inclined downward; and a trunk compartment 3 is provided from an area below the rear glass window 2 to the back end of the vehicle body. In the present embodiment, a space below the upper wall 7a of the trunk lid 7 is divided into an upper space 40, which joins the interior of the vehicle, and a lower space (i.e., below the upper space 40) inside the trunk compartment 3 by a tonneau cover 41 provided under the visual window 8 of the trunk lid 7.

The tonneau cover 41 has a sheet 42, which has substantially the same width as the interior 11 and is a main part of the tonneau cover 41. The base end of the sheet 42 is contained in a roll-type container 43 in a manner such that the base end is forced by a spring in the winding direction. The container 43 is installed on the back side of the rear seats 4. The top end of the sheet 42 is coupled to the back-face side of the trunk lid 7, at a position under the visual window 8. Therefore, the sheet 42, which is pulled out from the container 43, is arranged substantially horizontally, so that it does not obstruct a rear visual field observed from the interior 11 through the visual window 8 of the trunk lid 7. That is, as shown in FIG. 10, it is possible to observe a field on the back side of the vehicle body, above the sheet 42 from the interior 11 through the visual window 8.

Also in this embodiment, a part of the tonneau cover 41 is made by a hard board 44, whose front end is rotatably supported at the back side of the rear seats 4, and the lower face of the hard board 44 is supported by the sheet 42. Therefore, the hard board 44 can improve the appearance of the interior of the vehicle, and also can stabilize the motion of the sheet 42. In addition, in the case of using the tonneau cover 41 having the sheet 42 as the main part, when the height of baggage contained in the trunk compartment 3 is high, a part of the tonneau cover 41 slightly expands upward (see a virtual line in FIG. 9), so that the baggage can be contained.

In the sedan vehicle of the present embodiment, the visual window 8 is provided at the rear wall 7b of the trunk lid 7, and the tonneau cover 41 is provided in a manner such that it is basically positioned lower than the visual window 8. Therefore, a wide rear visual field can be obtained, which includes both the rear visual field through the rear glass window 2, and the rear visual field through the visual window 8. Therefore, also in the present embodiment, the trunk lid 7 can be sufficiently high so as to sufficiently increase the capacity of the trunk compartment 3 in the vertical direction, without sacrificing the rear visual field.

Also in this embodiment, it is preferable to attach a visual-field control device (such as the visual-field control panel 10 of the first embodiment or the acrylic resin boards 31 of the fourth embodiment) to the visual window 8 of the trunk lid 7.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A structure of a rear part in a body of a vehicle, wherein:
a rear glass window is provided at a rear end part of a roof of the vehicle, and the rear glass window is inclined downward toward the back of the vehicle body;
a trunk compartment is formed from a part below an attachment part of the rear glass window to a rear end part of the vehicle body;
a trunk lid is attached to a lower edge of the attachment part of the rear glass window in a manner such that the trunk lid can be opened and closed freely;
a visual window for observing a field on the back side of the vehicle body is provided in a wall of the trunk lid, the wall being positioned on the back side of the vehicle body;
a partition wall for parting the trunk compartment from the interior of the vehicle is provided below the rear glass window; and
an interior window for observing the field on the back side of the vehicle body through the visual window of the trunk lid is formed in the partition wall, wherein the interior window and the visual window are positioned to overlap each other in a viewing direction of a driver of the vehicle.

2. The structure in accordance with claim 1, wherein:
a visual-field control device for permitting observation of the field on the back side of the vehicle body from the interior of the vehicle and for preventing the trunk compartment from being observed from the back side of the vehicle body is provided at the visual window.

3. The structure in accordance with claim 1, wherein:
a visual-field control device for preventing the trunk compartment from being observed is provided at the interior window.

4. The structure in accordance with claim 2, wherein:
the visual-field control device has a visual-field control film, whose transparency varies depending on a visual angle.

5. A structure of a rear part in a body of a vehicle, wherein:
a rear glass window is provided at a rear end part of a roof of the vehicle, and the rear glass window is inclined downward toward the back of the vehicle body;
a trunk compartment is formed from a part below an attachment part of the rear glass window to a rear end part of the vehicle body;
a trunk lid is attached to a lower edge of the attachment part of the rear glass window in a manner such that the trunk lid can be opened and closed freely; and
a visual window for observing a field on the back side of the vehicle body is provided in a wall of the trunk lid, the wall being positioned on the back side of the vehicle body;
a partition wall for parting the trunk compartment from the interior of the vehicle is provided below the rear glass window;
an interior window for observing the field on the back side of the vehicle body through the visual window of the trunk lid is formed in the partition wall;
a visual-field control device for preventing the trunk compartment from being observed is provided at the interior window; and
the visual-field control device has a visual-field control film, whose transparency varies depending on a visual angle.

6. The structure in accordance with claim 4, wherein:
the visual-field control film provided at the visual window of the trunk lid is formed so as to set an opaque angle range of the visual-field control film to an angle range which prevents the bottom side of the trunk compartment from being observable from the back side of the vehicle body.

7. The structure in accordance with claim 5, wherein:
the visual-field control film is provided at the interior window in the partition wall and is formed so as to set an opaque angle range of the visual-field control film to an angle range which prevents the trunk compartment from being observable from each side window of the vehicle body.

8. The structure in accordance with claim 1, wherein:
a cover, which is arranged substantially horizontally so as to cover the upper side of the trunk compartment, is provided under the visual window.

9. The structure in accordance with claim 4, wherein:
the wall of the trunk lid further comprises an outer panel and an inner panel; and
the visual window is formed through an opening in the outer panel and an opening in the inner panel, wherein;
the visual-field control device is a visual-field control panel having the visual-field control film,
the visual-field control panel is attached to the opening of the inner panel; and
a resin panel is attached to the opening of the outer panel.

10. The structure in accordance with claim 6, wherein:
the opaque angle range of the visual-field control film is set to a vertical range from 0 to 55 degrees with respect to a plane perpendicular to the visual-field control device.

11. The structure in accordance with claim 7, wherein:
the opaque angle range of the visual-control film is set to have one each of a left range and a right range of 25 to 55 degrees measured horizontally from a vertical plane along a longitudinal centerline of the vehicle.

12. The structure in accordance with claim 3, wherein:
the visual-field control device comprises a louver-type shutter, the louver-type shutter opening and closing to control a rear visual field to the visual-field control device.

13. The structure in accordance with claim 3, wherein:
the visual-field control device comprises a single board shutter, the single board shutter opening and closing to control a rear visual field to the visual-field control device.

14. The structure in accordance with claim 1, wherein:
the partition wall includes a horizontal wall, which has substantially the same height as the lower edge of the rear glass window and covers the upper side of the trunk compartment substantially horizontally, and a front wall, which bends downward from the front end of the horizontal wall; and
the interior window is provided at the front wall.

15. The structure in accordance with claim 14, wherein:
an upper end portion of the front wall protrudes forward from the position of the interior window.

16. The structure in accordance with claim 2, wherein:
the visual-field control device is formed by stacking a plurality of board members, where printing is applied to each stacked plane of the board members.

17. The structure in accordance with claim 8, wherein:
the cover has a sheet member which can expand upward to accommodate baggage placed in the trunk compartment.

* * * * *